US011026136B2

(12) United States Patent
Raval et al.

(10) Patent No.: US 11,026,136 B2
(45) Date of Patent: Jun. 1, 2021

(54) HANDOVERS WITH SIMPLIFIED NETWORK TOPOLOGY (71) Applicant: Parallel Wireless, Inc., Nashua, NH (US)

(72) Inventors: Kartik Shashikant Raval, Pune (IN); Sourabh Nanoti, Pune (IN); Prashanth Rao, Wilmington, MA (US); Praveen Kumar, Pune (IN); Anupam Goyal, Pune (IN); Harish Kumar Lohar, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/721,728

(22) Filed: Sep. 29, 2017

(65) Prior Publication Data
US 2018/0041927 A1 Feb. 8, 2018

Related U.S. Application Data (63) Continuation-in-part of application No. 14/642,544, filed on Mar. 9, 2015, now Pat. No. 10,595,242.
(Continued)

(51) Int. Cl.
*H04W 36/00* (2009.01)
*H04W 36/14* (2009.01)
(Continued)

(52) U.S. Cl.
CPC ....... *H04W 36/0061* (2013.01); *H04W 24/02* (2013.01); *H04W 36/0038* (2013.01);
(Continued)

(58) Field of Classification Search
CPC ......... H04W 36/0055; H04W 36/0061; H04W 36/0066; H04W 36/0038; H04W 36/14;
(Continued)

(56) References Cited

U.S. PATENT DOCUMENTS 8,644,831 B2    2/2014 Bae et al.
9,226,204 B2   12/2015 Kuningas
(Continued)

FOREIGN PATENT DOCUMENTS

CN    102958197 A    3/2013
EP    2816846 A1   12/2014
(Continued)

OTHER PUBLICATIONS

Local Gateway Assisted Handover Key Derivation in Enterprise Femtocell Network, Scientific Research Publishing, Apr. 2015.*
(Continued)

*Primary Examiner* — Yuwen Pan
*Assistant Examiner* — Hung K Du
(74) *Attorney, Agent, or Firm* — Michael Y. Saji; David W. Rouille (57) ABSTRACT Systems and methods for handovers with simplified network topology are disclosed. In a first embodiment, a method is disclosed, comprising: at a coordinating gateway during a handover of a mobile device from a first base station to a second base station, receiving a first handover request from the first base station; discarding a first shared security key received in the first handover request; sending a tunnel switching request to a core network node; obtaining precursors for a second shared security key from the core network node in a response to the switching request; sending a second handover request to the second base station with the precursors to calculate the second shared security key for securing a data connection for the mobile device following the handover; deriving the second shared security key from the obtained precursors at the first base station; and deriving the second shared security key from the obtained precursors at the coordinating gateway.

13 Claims, 8 Drawing Sheets

Related U.S. Application Data (60) Provisional application No. 62/401,695, filed on Sep. 29, 2016, provisional application No. 61/976,146, filed on Apr. 7, 2014, provisional application No. 61/949,455, filed on Mar. 7, 2014.

(51) Int. Cl.

| | | |
|---|---|---|
| *H04W 24/02* | (2009.01) | |
| *H04W 48/16* | (2009.01) | |
| *H04W 84/18* | (2009.01) | |
| *H04W 88/12* | (2009.01) | |
| *H04W 88/16* | (2009.01) | |
| *H04W 92/20* | (2009.01) | |
| *H04W 92/04* | (2009.01) | |

(52) U.S. Cl.
CPC ....... *H04W 36/0066* (2013.01); *H04W 36/14* (2013.01); *H04W 48/16* (2013.01); *H04W 36/0055* (2013.01); *H04W 84/18* (2013.01); *H04W 88/12* (2013.01); *H04W 88/16* (2013.01); *H04W 92/045* (2013.01); *H04W 92/20* (2013.01)

(58) Field of Classification Search
CPC ..... H04W 24/02; H04W 48/16; H04W 92/20; H04W 92/045; H04W 88/12; H04W 88/16; H04W 84/18
See application file for complete search history.

(56) References Cited

U.S. PATENT DOCUMENTS

| | | | |
|---|---|---|---|
| 9,510,256 B2 | 11/2016 | Krishna et al. | |
| 9,742,535 B2 | 8/2017 | Lorca Hernando | |
| 2012/0051275 A1* | 3/2012 | Alex | H04W 36/0055 370/312 |
| 2012/0163336 A1* | 6/2012 | Adjakple | H04W 12/04 370/331 |
| 2012/0220290 A1 | 8/2012 | Awad | |
| 2012/0263096 A1* | 10/2012 | Masini | H04W 36/10 370/315 |
| 2012/0307795 A1 | 12/2012 | Takahashi et al. | |
| 2012/0315956 A1 | 12/2012 | Mochida et al. | |
| 2013/0077482 A1 | 3/2013 | Krishna et al. | |
| 2013/0136074 A1 | 5/2013 | Okino | |
| 2014/0079026 A1 | 3/2014 | Dimou et al. | |
| 2014/0204765 A1 | 7/2014 | Chai et al. | |
| 2014/0233386 A1 | 8/2014 | Jamadagni et al. | |
| 2014/0308959 A1 | 10/2014 | De Benedittis et al. | |
| 2015/0146519 A1* | 5/2015 | Zakrzewski | H04W 8/30 370/221 |
| 2015/0215774 A1* | 7/2015 | Huang | H04W 76/10 455/422.1 |
| 2015/0257051 A1 | 9/2015 | Rao et al. | |
| 2016/0014650 A1 | 1/2016 | Laganier et al. | |
| 2016/0105919 A1 | 4/2016 | Kawaguchi et al. | |
| 2016/0119847 A1* | 4/2016 | Park | H04W 36/00837 455/438 |
| 2016/0119941 A1 | 4/2016 | Ko et al. | |
| 2016/0142944 A1 | 5/2016 | Cao | |
| 2016/0165438 A1 | 6/2016 | Xu et al. | |
| 2016/0165499 A1 | 6/2016 | Xu et al. | |
| 2016/0183137 A1 | 6/2016 | Fukuta et al. | |
| 2016/0227449 A1 | 8/2016 | Sivavakeesar et al. | |
| 2017/0070923 A1 | 3/2017 | Li et al. | |
| 2017/0156086 A1 | 6/2017 | Tomici et al. | |

FOREIGN PATENT DOCUMENTS

| | | |
|---|---|---|
| WO | 2013107346 A1 | 7/2013 |
| WO | 2015199241 A1 | 12/2015 |
| WO | 2016141964 A1 | 9/2016 |

OTHER PUBLICATIONS

PCT International Search Report for PCT/US18/12852, received Mar. 9, 2018.
PCT International Search Report for PCT/US17/54639, received Jan. 19, 2018.
Third Generation Partnership Project, "3rd Generation Partnership Project; Technical Specification Group Services and System Aspects; 3GPP System Architecture Evolution (SAE); Security Architecture (Release 9)," 3GPP TS 33.401 V9.8.0 (Oct. 2015).
Peng Wang, Xiaojuan Zhang, "Local Gateway Assisted Handover Key Derivation in Enterprise Femtocell Network," Int. J. Communications, Network and System Sciences, 2015, 70-78.

\* cited by examiner

HANDOVERS WITH SIMPLIFIED NETWORK TOPOLOGY

CROSS-REFERENCE TO RELATED APPLICATIONS

This application is a continuation-in-part of, and claims priority under 35 U.S.C. § 120 to, U.S. patent application Ser. No. 14/642,544, "Federated X2 Gateway," filed Mar. 9, 2015, and is also a non-provisional conversion of, and claims priority under 35 U.S.C. § 119(e) to, U.S. Provisional App. No. 62/401,695, "Handovers with Simplified Network Topology," filed Sep. 29, 2016, each hereby incorporated by reference in their entirety for all purposes.

This application also incorporates by reference U.S. patent application Ser. No. 14/942,950, "Seamless Mobile Handover," filed Nov. 16, 2015; U.S. application Ser. No. 15/173,613, "Inter-PGW Handover Architecture," filed Jun. 3, 2016; U.S. patent application Ser. No. 14/034,915, "Dynamic Multi-Access Wireless Network Virtualization," filed Sep. 24, 2013; U.S. application Ser. No. 14/822,839, "Congestion and Overload Reduction," filed Aug. 10, 2015; and U.S. App. No. 62/375,341, "S2 Proxy for Multi-Architecture Virtualization," Aug. 15, 2016, each in its entirety for all purposes.

Additionally, 3GPP TS 33.401 and TS 36.423 are hereby incorporated by reference in their entirety for all purposes.

BACKGROUND

In the near future, LTE small cells will slowly and steadily fill the gaps in the LTE coverage provided by macros. These cells will also augment the overall capacity of the network in terms of throughput. They are inexpensive, easier to deploy and operate. However, they need to connect to a gateway device to reach the core network. Without a gateway device, the sheer number of small cells will overwhelm the core network with signaling traffic. An intelligent gateway device can significantly reduce signaling traffic for the core network by performing virtualization and topology hiding.

SUMMARY

Systems and methods for handovers with simplified network topology are disclosed.

In a first embodiment, a method is disclosed, comprising: at a coordinating gateway during a handover of a mobile device from a first base station to a second base station, receiving a first handover request from the first base station; discarding a first shared security key received in the first handover request; sending a tunnel switching request to a core network node; obtaining precursors for a second shared security key from the core network node in a response to the switching request; sending a second handover request to the second base station with the precursors to calculate the second shared security key for securing a data connection for the mobile device following the handover; deriving the second shared security key from the obtained precursors at the first base station; and deriving the second shared security key from the obtained precursors at the coordinating gateway.

The core network node may be a mobility management entity (MME) in a Long Term Evolution (LTE) network, The first handover request may be an X2 handover request, and The second handover request may be an S1 handover request. The tunnel switching request may be an S1 path switch message, and The precursors may be next hop (NH) and next hop chaining count (NCC) values. The first shared security key and the second shared security key may be KeNB* keys. The method may further comprise caching data between sending the tunnel switching request and completing the second handover request. The method may further comprise, at the coordinating gateway, proxying the core network node to the second base station and proxying the second base station to the core network node. The method may further comprise proxying the core network node to the second base station by providing a mobility management entity (MME) functionality at the coordinating gateway, and proxying the second base station to the core network node by providing a base station interface to the core network node at the coordinating gateway. The method may further comprise deriving the second shared security key from the obtained precursors using a carrier frequency of the second base station and a cell identifier of the second base station. The carrier frequency may be an EARFCN.

In a second embodiment, a method is disclosed, comprising: at a coordinating gateway during a handover of a mobile device from a first base station to a second base station, the coordinating gateway providing proxy services to the first base station, obtaining a first security key for the mobile device from a core network node during an attach procedure for the mobile device to the core network node; receiving a first handover request from the first base station; calculating a second security key based on the first security key, a carrier frequency of the second base station, and a cell identifier of the second base station; and sending a second handover request to the second base station with the second security key for securing a data connection for the mobile device following the handover.

The core network node may be a mobility management entity (MME) in a Long Term Evolution (LTE) network, The first handover request may be an X2 handover request and The second handover request may be an S1 handover request. The carrier frequency may be an Evolved Absolute Radio Frequency Channel Number (EARFCN) and the cell identifier may be a physical cell identifier (PCI). The method may further comprise obtaining the carrier frequency and the cell identifier of the second base station during a prior handover involving the second base station and the coordinating gateway. The first shared security key may be a KeNB key and the second shared security key may be a KeNB* key. The method may further comprise caching data between receiving the first handover request and completing the second handover request. The method may further comprise, at the coordinating gateway, proxying the core network node to the second base station and proxying the second base station to the core network node. The method may further comprise proxying the core network node to the second base station by providing a mobility management entity (MME) functionality at the coordinating gateway, and proxying the second base station to the core network node by providing a base station interface to the core network node at the coordinating gateway.

In a third embodiment, a method is be disclosed, comprising: extracting a target cell ID and source physical cell ID (PCI) of a first base station from an S1 handover request for a first user equipment (UE) received from the first base station at a coordinating gateway; using the source PCI to perform setup of an X2 link between the first base station and the coordinating gateway; and subsequently performing a handover of a second UE using the X2 link between the first base station and the coordinating gateway.

The method may further comprise extracting a target cell ID and source physical cell ID (PCI) during the S1 handover request, and using the source PCI to perform setup of the X2 link. The method may further comprise extracting an E-UTRA Absolute Radio Frequency Channel Number (EARFCN) of the first base station during the S1 handover request, and using the source PCI to perform setup of the X2 link.

DETAILED DESCRIPTION

As described above, in the near future, LTE small cells will slowly and steadily fill the gaps in the LTE coverage provided by macros. These cells will also augment the overall capacity of the network in terms of throughput. They are inexpensive, easier to deploy and operate. However, they need to connect to a gateway device to reach the core network. Without a gateway device, the sheer number of small cells will overwhelm the core network with signaling traffic. An intelligent gateway device can significantly reduce signaling traffic for the core network by performing virtualization and topology hiding.

When so many LTE small cells are deployed especially to fill coverage gaps, there will be users moving between the small cell coverage and the nearby macro coverage areas. Lot of handover related signaling is anticipated. There are multiple approaches to performing a handover in LTE.

1. S1 based handover: In this approach, the handover will use S1 interface and it will pass through the MME in the packet core network. The amount of handovers and signaling required for each handover is very taxing for MME. Operator will have to deploy a high capacity bank of MMEs to support this which means high CAPEX.

2. X2 based handover: In this approach, there will be X2 connectivity formed between a small cell and a macro and the handover is carried out directly between the two nodes without involvement of MME. MME is later informed of the handover result. This approach reduces the load on MME by a great extent. However, it has a different type of problem. Many macros deployed in the operator network are not open to performing X2 interface with third party vendors' small cells. Or alternatively, a vendor's small cells may not support X2 even if a macro cell does support X2, so that the network operator is not able to use X2 handover from the macro to the particular vendor's small cell. This is for a third party small cell that can communicate with the VS via S1.

3. X2 based handover (2): Another major hurdle is that there could be many small cells that border/operate within a macro's coverage. So there will be quite a few X2 connections to a macro from nearby small cells. This puts heavy load on existing macro.

In some embodiments, the VS virtualizes each eNB so that it is treated like a cell within an eNB by the core network. In this way the VS acts as a virtual eNB. The cells are able to be individually accessed by the core, but by virtue of the core not having to treat them as eNBs, signaling requirements are reduced. However, the cells each are eNBs and each have their own eNB identities, PCI, etc. One additional benefit of the VS acting as an eNB is that the VS terminates all X2 and S1 connections. This allows the VS to act as a gateway, proxy, translation proxy, or interworking gateway between X2 and S1, abstracting away whether a given handover is an X2 handover or an S1 handover. The S1 and X2 proxy functionality of the VS is described elsewhere herein and in U.S. patent application Ser. No. 14/942,950, "Seamless Mobile Handover," filed Nov. 16, 2015; U.S. application Ser. No. 15/173,613, "Inter-PGW Handover Architecture," filed Jun. 3, 2016; U.S. patent application Ser. No. 14/034,915, "Dynamic Multi-Access Wireless Network Virtualization," filed Sep. 24, 2013; U.S. application Ser. No. 14/822,839, "Congestion and Overload Reduction," filed Aug. 10, 2015; and U.S. App. No. 62/375,341, "S2 Proxy for Multi-Architecture Virtualization," Aug. 15, 2016.

The presently disclosed virtualization server tries to solve the handover problem between small cells and macro in a different manner.

Three significant benefits are reaped by the use of this technique, in some embodiments: (1) enhanced interoperability between eNBs of different manufacturers, and between standard eNBs and virtualized eNBs; (2) facilitation of virtualization, as the VS acts to virtualize all of the eNBs that it manages, both towards the core and towards other base stations, such as macro base stations for purposes of X2; and (3) reduction of load on the core network, specifically MMEs, by the use of X2 handovers, which tunnel data directly from the source eNB to the target eNB without requiring the data to be decrypted and encrypted, etc. at the MME in the core network.

An overview of S1 and X2 handover handling in accordance with some embodiments follows.

In the LTE protocol, a handover may be initiated via either an S1 message (between an MME and an eNodeB) or an X2 message (between eNodeBs). In some embodiments, a handover initiation received by the virtualization server in either of these protocols may be mapped to the other protocol, where appropriate. The mapping may be performed and/or stored at a UE module as shown below in FIG. 8 as UE module 841, in some embodiments. This is possible because the virtualization server acts as a protocol endpoint and produces its own protocol messages, and because the virtualization server is the gateway for both any macro eNodeBs and also the MME, from the perspective of a mesh eNodeB internal to the network. In most cases, the virtualization server may map handover requests from X2 to S1, as S1 may provide greater flexibility.

Handover from Macro to eNodeB (proxied by virtualization server), the Hand-In, may be supported via X2, in some embodiments. Handover from eNodeB to Macro, the Hand-Out, may also be supported via X2, in some embodiments. Handover between eNodeBs may be supported via S1 messages to the virtualization server, in some embodiments. It should be noted that between eNodeB and virtualization server, S1 may be used for handover signaling. So, the virtualization server may perform the conversion between S1 and X2 in either direction, in some embodiments.

In some embodiments, the Handovers between eNodeBs managed by the same virtualization server are short circuited via virtualization server. Thus the handover signaling is not passed onto the MME and is hidden from the MME. eNodeB initiates the S1 Handover procedure and virtualization server determines the target eNodeB by looking at the last 8 bits of the target cell-id IE. If this cell is found then the handover is marked as non-pass through (ie, it will not be passed to MME) and thus all the handover signaling is short circuited at virtualization server. If the cell is not found by virtualization server, then the handover is marked at pass-through handover and virtualization server proxies the handover signaling towards MME.

In some embodiments, the eNodeB may use the S1 handover procedure, with the caveat that if the virtualization server has an X2 connection towards the target eNodeB, the virtualization server may convert the S1 handover initiated by eNodeB into an X2 handover. In the other direction, X2 handover signaling coming from target eNodeB may be remapped to S1 handover signaling towards eNodeB, in some embodiments. Although this may involve virtualization server in decoding/encoding/interworking/translating/proxying S1 to and from X2, the amount of changes at eNodeB are minimized since it may use the existing S1 handover functionality. Thus eNodeBs are unaware of the type of Handover (X2/S1) carried out by virtualization server, in some embodiments. For eNodeB, it is always an S1 Handover.

A Global eNodeB ID to EUTRAN Cell-id MAP may be maintained at RAN module, in some embodiments. An entry into the map may be added as and when the SON establishes the X2 connections with peer X2 Endpoints. When X2 endpoint goes down, the corresponding entry may be deleted. UE module may provide a Global eNodeB ID to EPC module with which EPC module may select the X2 endpoint for HO signaling. UE Entry at the EPC module may contain the X2 endpoint handler till the time HO completes.

As an example, for an X2 handover request received at the virtualization server from a macro eNodeB, the virtualization server may map the request to an S1 handover request and may send the S1 handover request to a mesh eNodeB internal to the network. The MME UE S1AP ID information element may be generated locally at the virtualization server, since this information element is not present in the original X2 request. To track the handover request, the originally-received eNodeB UE X2AP ID may be stored in an S1/X2 handover mapping table, together with the new MME UE S1AP ID. The transport layer address of the new S1 request may be set to the uplink GTP tunnel endpoint.

When performing the reverse mapping, from an S1 handover acknowledgement to an X2 acknowledgement, the UL GTP tunnel endpoint may be set at the S1-issuing MME to the GTPU endpoint at the virtualization server, in some embodiments. This allows the virtualization server to decrypt and forward any information in the request. As well, for the target eNodeB to source eNodeB transparent container information element, the radio resource control (RRC) E-UTRA handover command as defined in TS 36.331 § 10.2.2 (hereby incorporated by reference in its entirety for all purposes) may be used, in some embodiments.

Similarly, a hand-in request from a macro eNodeB to a mesh eNodeB may be received as an X2 handover request at the virtualization server and may be mapped to an S1 handover request for the mesh eNodeB, in some embodiments.

A hand-out request from a mesh eNodeB to a macro eNodeB may be received as an X2 handover request at the virtualization server. No protocol mapping is needed, as the macro eNodeB supports X2 handovers, but various parameters, including addresses, location reporting information, and the handover restriction list, may be changed before the X2 handover request is passed to the macro.

Handovers between mesh eNodeB nodes may continue to be performed directly without intermediation by the virtualization server, using the X2 protocol, in some embodiments and as shown by FIGS. 1, 2, 3, and 8.

Since no proprietary changes can be expected on third party eNodeBs, supporting them would mean adhering to standard X2 interface between the virtualization server and third party eNodeBs. The per Macro-eNodeB access side IP model implemented at the virtualization server can be supported for third party eNodeBs.

Figure 1:
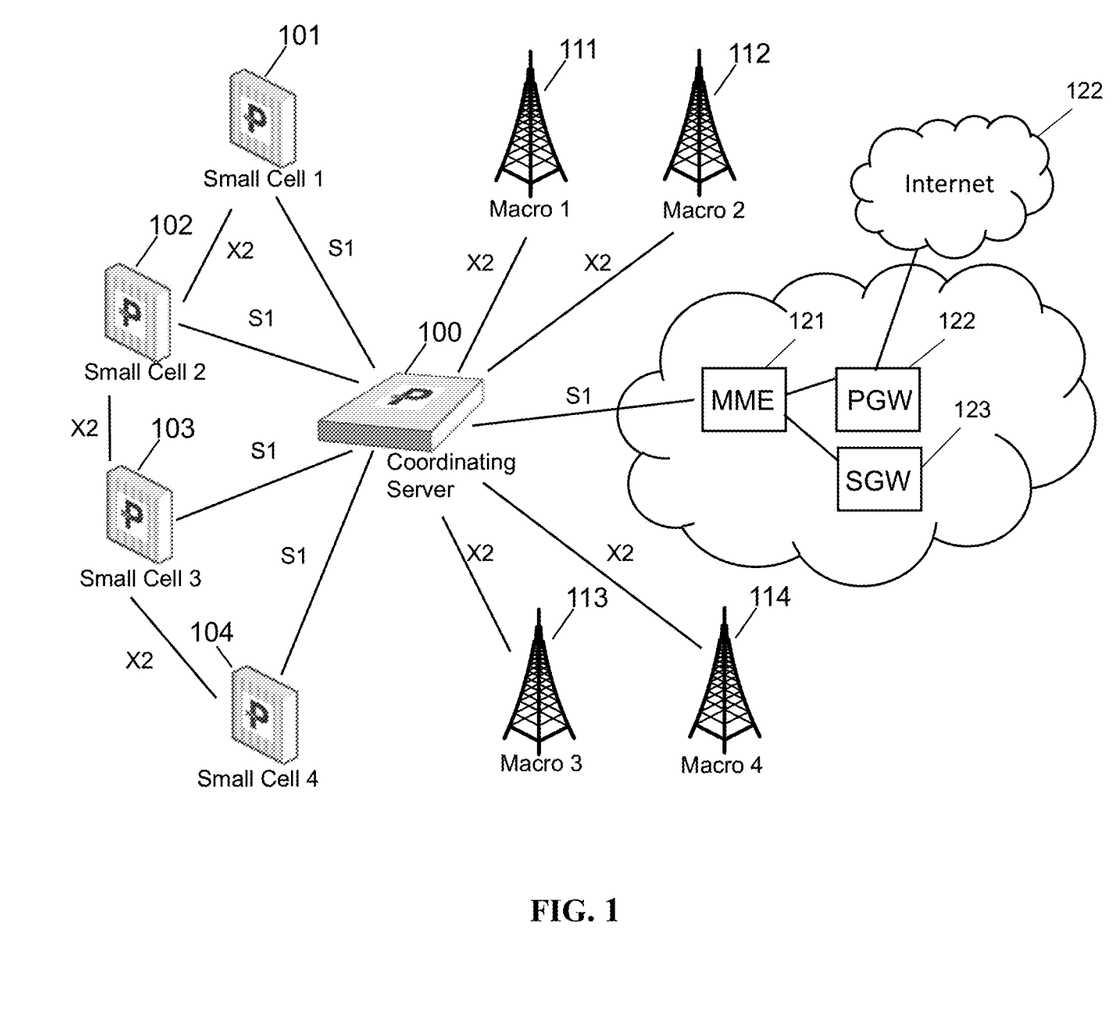
FIG. 1 is a schematic network diagram, in accordance with some embodiments.

FIG. 1 is a schematic network diagram, in accordance with some embodiments.

Figure 2:
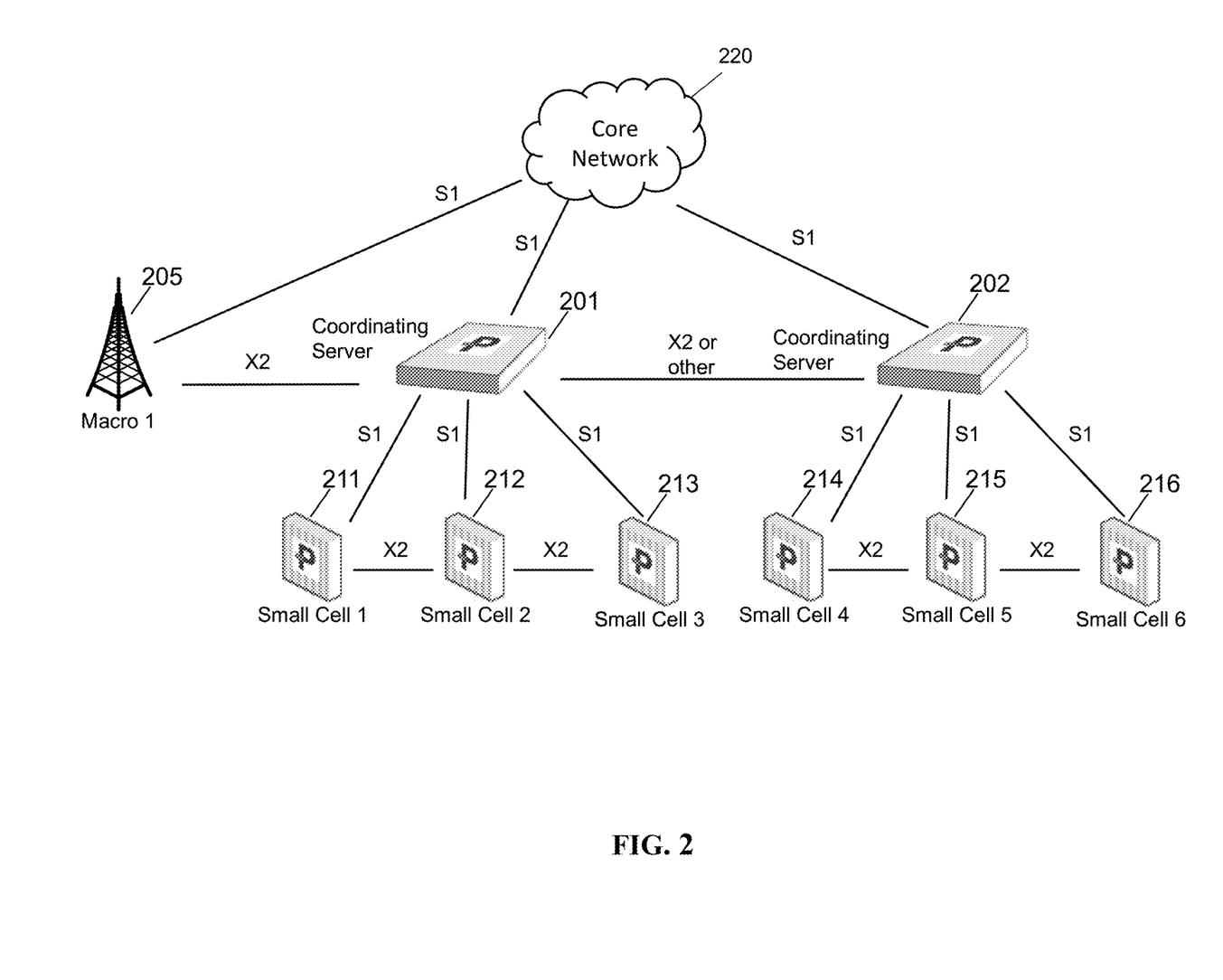
FIG. 2 is a schematic network diagram showing multiple coordinating servers, in accordance with some embodiments.

A virtualization server (VS) 100 virtualizes small cells 101, 102, 103, 104 and represents itself as a macro towards the nearby macros 111, 112, 113, 114 while establishing X2 connectivity. Small cells 101, 102, 103, 104 are connected to the VS via the S1 interface and to each other via the X2 interface. The VS aggregates or groups them and presents itself as a virtual cell on their behalf to all the nearby existing macro cells 111, 112, 113, 114, including via X2. Certain conditions need to be fulfilled for this virtualization to work, i.e. All small cells part of a group (large virtual macro cell) need to have exactly same most significant 20 bits of global ENodeB-id, in some embodiments. A single VS can also represent multiple large virtual cells as required, but not shown here to avoid complexity. FIG. 2 shows a configuration showing multiple virtual cells. VS 100 is the gateway to the core network (MME 121, PGW 122, and SGW 123) as well as the Internet 122 for all of the virtualized small cells 101, 102, 103, 104.

Notably, the VS is in the data path between, and acts as a gateway for, small cells 101, 102, 103, 104 towards the core network. The VS thereby is enabled to terminate connections and tunnels, and interwork those connections and tunnels, in some cases before sending to the core network.

Advantages of such a network topology include the following: Small cells will only have to do S1 interface. No complexity of establishing and maintaining X2 with multiple nearby macros; Macro cells will only have to do X2 with a single VS device which represents and hides all the small cells behind it; and MME is kept out of the handover signaling (due to how X2 handover between two cells works), thereby reducing load on core network.

Creating such a topology as depicted in FIG. 1 has many advantages. It simplifies the network deployment to a great extent. Simplification is the key which will enable more and more small-cell deployments worldwide. The below call flows show that handover is a solvable issue in above topology. Advantages far outweigh the minor disadvantages in certain call flows.

FIG. 2 is a schematic network diagram showing multiple coordinating servers, in accordance with some embodiments. FIG. 2 shows a plurality of small cells coupled with coordinating servers (VSes) 201 and 202, in an arrangement where small cells 211, 212, and 213 are virtualized by VS 201 and small cells 214, 215, 216 are virtualized by VS 202.

VS 201 and VS 202 are peers and provide virtualization of the small cells under them; the VS nodes make themselves known to the network as eNodeBs, thereby acting as virtual eNodeBs. No X2 connection is available directly between small cell 213 and small cell 214; however, a connection between VS 201 and VS 202 provides handover capability, either via X2 or via another protocol. Handovers with the macro 205 are also possible with the small cells via the VS 201 (or VS 202, link not shown) as described herein. Finally, an S1 handover is also still available via core network 220.

In some embodiments, VS 201 is a virtual eNodeB and VS 202 is a virtual eNodeB, each managing up to 255 actual eNodeBs and making them part of the network as cells. This reduces neighbor relations so that up to 512 eNodeBs can be handled using a simple neighbor table of just two nodes, VS 201 and VS 202. The use of multiple VS gateways enables the creation of natural geographic subsets of eNBs, instead of requiring complex coordination between multiple MMEs to split management of a large number of cells.

Figure 3:
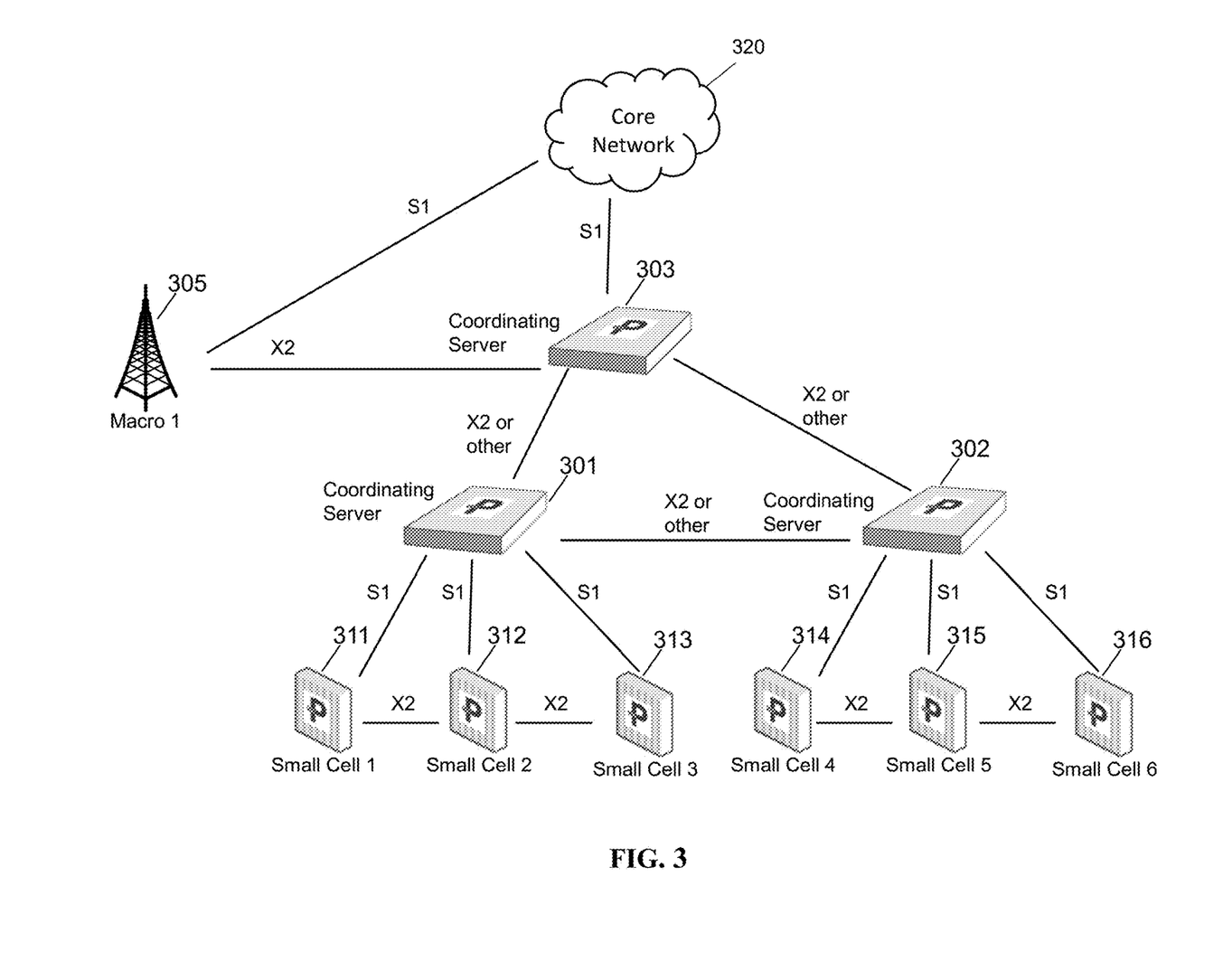
FIG. 3 is a schematic network diagram showing a hierarchy of coordinating servers, in accordance with some embodiments.

FIG. 3 is a schematic network diagram showing a hierarchy of coordinating servers, in accordance with some embodiments. In FIG. 3, a hierarchy is in place between coordinating servers (VSes) 301, 302, and 303. VS 301 virtualizes small cells 311, 312, and 313. VS 302 virtualizes small cells 314, 315, and 316. VS 301 and VS 302 relate to each other as peers and can send X2 (or other protocol) messages to each other, but do not expose each of the underlying small cells to each other as individual eNodeBs but rather as cells.

VS 303 is hierarchically placed above VS 301 and VS 302, and hides and virtualizes VS 301 and 302 from macro 305 and core network 320. This virtualization may occur using the same method, for example, virtualizing VS 301 as a cell of VS 303, in some embodiments. This drastically reduces signaling activity. In some embodiments, further multi-level hierarchies could be used to any depth to virtualize a large number of small cells.

In another embodiment, small cells 311, 312, 313, 314, 315, 316 may all be virtualized as cells at VS 303, in some embodiments. This retains addressability of all cells in the network but continues to reduce signaling activity at each hierarchical level.

Various modifications are required to effectively map between S1 and X2 handovers, in particular in relation to the LTE security model. This information is more fully explained at 3GPP TS 33.401, hereby incorporated in its entirety for all purposes. In LTE, a shared security key/token/value/secret is calculated based on shared secret information. The shared security key is called a KeNB. During a handover, a first KeNB is used, and after the handover is complete, a second KeNB is used; this second KeNB is called KeNB* and is generated at both sides of the connection after the handover is complete to provide forward secrecy. Forward secrecy refers to the property that, for an eNB with knowledge of a KeNB, shared with a UE, it shall be computationally infeasible to predict any future KeNB, that will be used between the same UE and another eNB. More specifically, n hop forward security refers to the property that an eNB is unable to compute keys that will be used between a UE and another eNB to which the UE is connected after n or more handovers (n=1 or 2).

As KeNBs are derived, the parameters from which the KeNB is derived are referred to herein as precursors. In some embodiments, the correct precursors are provided to enable the small cell eNB and/or the VS, in some embodiments, to calculate the KeNB and create an appropriate security context. Derivation of KeNB is described in 3GPP TS 33.401 Annex A.5, hereby incorporated by reference, using target PCI, EARFCN-DL, NH, or the current KeNB as appropriate according to the spec. The eNB shall send the NCC used for KeNB* derivation to the UE.

In the standard for an X2 handover, the source eNB performs vertical key derivation with NH, NCC and then forwards the KeNB* and NCC to the target eNB, which uses this KeNB* directly to communicate with the UE. In some embodiments described herein, an S1 handover translated to an X2 handover includes sending the X2 handover request from the VS to the target base station with the KeNB*, which is calculated based on previously stored NH, NCC pairs at the VS.

In the standard for an S1 handover, the source MME sends a new NH, NCC pair (i.e., precursors) to the target MME and the target eNB, within an S1 handover request, and the target eNB performs a derivation of the KeNB using the NH, NCC pair. In some embodiments described herein, a macro X2 handover translated to an S1 handover may include transmission of a new NH, NCC pair to the target eNB, as with a standard S1 handover.

An S1 path switch request occurs in the standard when the target eNB has completed handover signaling with the UE, and typically results in incrementing the NCC value at the MME and computation of a new NH, i.e., by using a KASME and a locally kept NH value according to 3GPP TS 33.401 Annex A.4. The MME then sends the newly completed NH, NCC pair to the target eNB in an S1 path switch request acknowledge message.

As in the standard, for S1 handover (i.e., for intra-VS handovers according to some embodiments), the source eNB includes AS algorithms used in the source cell (ciphering and integrity algorithms) in the source to target transparent container that shall be sent to the target eNB. The AS algorithms used by in the source cell are provided to the target eNB so that it can decipher and integrity verify the RRCReestablishmentComplete message.

The UE behavior is the same in the present embodiments regardless if the handover is S1, X2 or intra-eNB and does not differ from the standard behavior.

If the NCC value the UE received in the HO Command message from target eNB via source eNB is equal to the NCC value associated with the currently active KeNB, the UE shall derive the KeNB* from the currently active KeNB and the target PCI and its frequency EARFCN-DL using the function defined in Annex A.5.

If the UE received an NCC value that was different from the NCC associated with the currently active KeNB, the UE shall first synchronize the locally kept NH parameter by computing the function defined in Annex A.4 iteratively (and increasing the NCC value until it matches the NCC value received from the source eNB via the HO command message. When the NCC values match, the UE shall compute the KeNB* from the synchronized NH parameter and the target PCI and its frequency EARFCN-DL using the function defined in Annex A.5.

The UE shall use the KeNB* as the KeNB when communicating with the target eNB.

Access Security Management Entity or ASME is the entity which receives the top-level keys in an access network from the HSS. For E-UTRAN access networks, the role of the ASME is assumed by the MME. Chaining of KeNB is derivation of a new KeNB from another KeNB (i.e., at cell handover). EPS AS security context are the cryptographic keys at AS level with their identifiers, the Next Hop parameter NH, the Next Hop Chaining Counter parameter NCC used for next hop access key derivation, the identifiers of the selected AS level cryptographic algorithms and counters used for replay protection. Note that the EPS AS security context only exists when cryptographically protected radio bearers are established and is otherwise void. Refresh of KeNB is the derivation of a new KeNB from the same KASME and including a freshness parameter. K is the permanent key stored on the USIM on a UICC and in the Authentication Centre AuC. CK, IK is the pair of keys derived in the AuC and on the USIM during an AKA run. CK, IK shall be handled differently depending on whether they are used in an EPS security context or a legacy security context, as described in subclause 6.1.2. As a result of the authentication and key agreement, an intermediate key KASME shall be shared between UE and MME i.e. the ASME for EPS.

Figure 4:
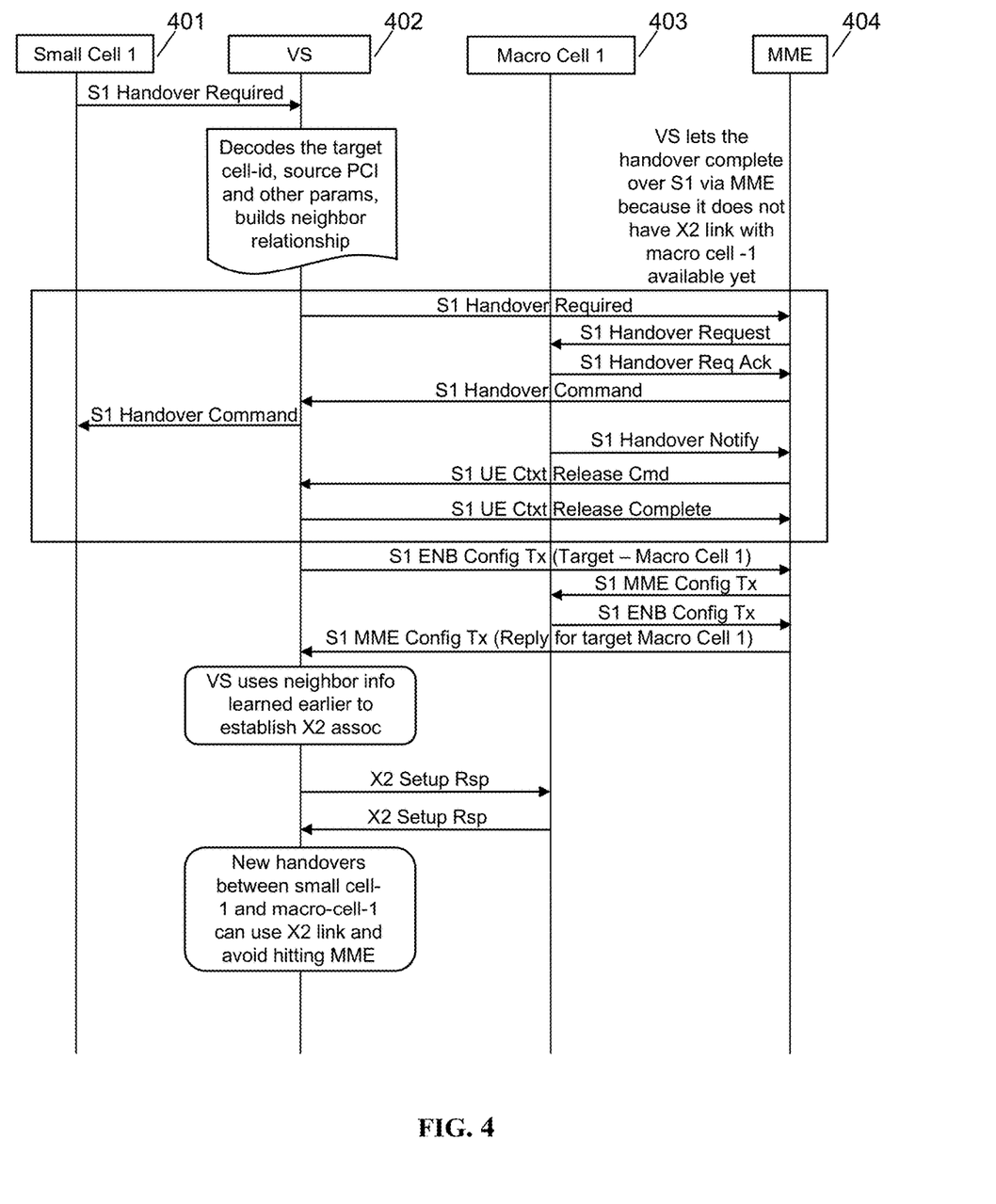
FIG. 4 is a call flow diagram showing an initial S1 handover, in accordance with some embodiments.

FIG. 4 is a call flow diagram showing an initial S1 handover, in accordance with some embodiments, showing setup of X2 connectivity between the VS and macro cells. A small cell 401 is shown, together with VS 402, macro 403, and MME 404. Other network nodes are not shown for clarity.

The X2 interface can be very dynamic, i.e. setup when a neighbor relationship is known, the neighbor X2 connectivity endpoint is also discovered runtime. The VS implements multiple learning techniques to know the neighbor relationship between connected small cells and nearby macro. Most of the techniques need an out of band interface with the cell, e.g. SON interface or Management System Interface. Hence these are used perfectly well when the cell is also manufactured by PW, i.e. PW CWS.

However, here we present a simple technique based solely on S1 interface connectivity with small cell which may be the case when the VS is deployed with third party small cells.

When the handover is started from small cell-1 towards macro-cell-1, the VS learns that both are neighbors (sets up the ANR relationship).

The VS decodes the S1-Handover-Required message coming in from Small Cell-1 and extracts the information of the cell, like PCI, EARFCN of the Small Cell-1.

The VS then initiates X2 setup procedure towards macro.

During X2 Setup, it learns more information about the macro Cell-1's PCI, EARFCN etc. and also, its neighbors.

The VS learns all this information and this is used later on during handover and other call flows.

The macro cell's PCI, EARFCN (E-UTRA Absolute Radio Frequency Channel Number, which is related to the frequency of the macro cell), and other information could be obtained during X2 setup, or during a prior S1 handover, in some embodiments. This information can be requested without any change required to the macro from a standard protocol perspective.

In some embodiments, the UE's security data (KeNB) is obtained by the VS at the time the UE attaches to the small cell.

Figure 5:
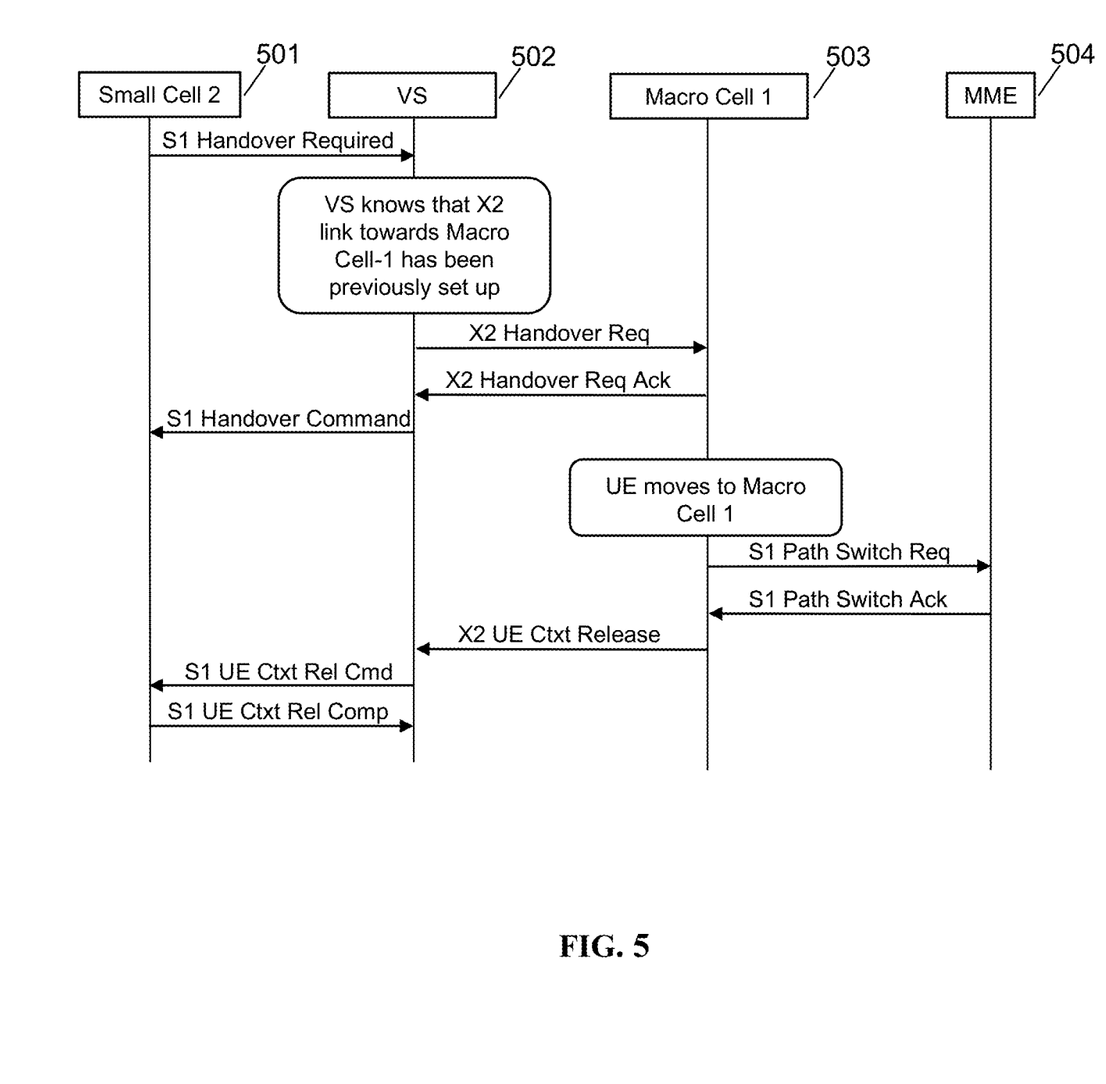
FIG. 5 is a call flow diagram showing an S1-X2 handover, in accordance with some embodiments.

FIG. 5 is a call flow diagram showing an S1-X2 handover, in accordance with some embodiments, showing a handover from LTE small cell towards macro using X2 link at the VS. Small cell 2 501 is shown, together with VS 502, macro cell 503, and MME 504. Other network nodes are not shown for clarity.

The VS now has X2 link available between the VS and the macro cell. The following call flow shows how a handover from small cell-2 or we can say any small cell towards Macro Cell-1 is going to use the X2 link.

To initiate X2 Handover Request towards Macro-Cell-1, the VS has to calculate the UE's security key to be used on access stratum between the Macro-Cell-1 and the UE.

When the UE came in to small-cell-1, the VS stored the 'Kenb' value as given out by MME to the Small Cell-1 for this UE.

The VS uses this value to compute the 'Kenb*' value as needed by target Macro Cell-1.

The VS knows the target PCI, target EARFCN-DL value of Macro-Cell-1 (since it has done X2 Setup procedure with Macro Cell-1). It uses these to calculate 'Kenb*'.

Figure 6:
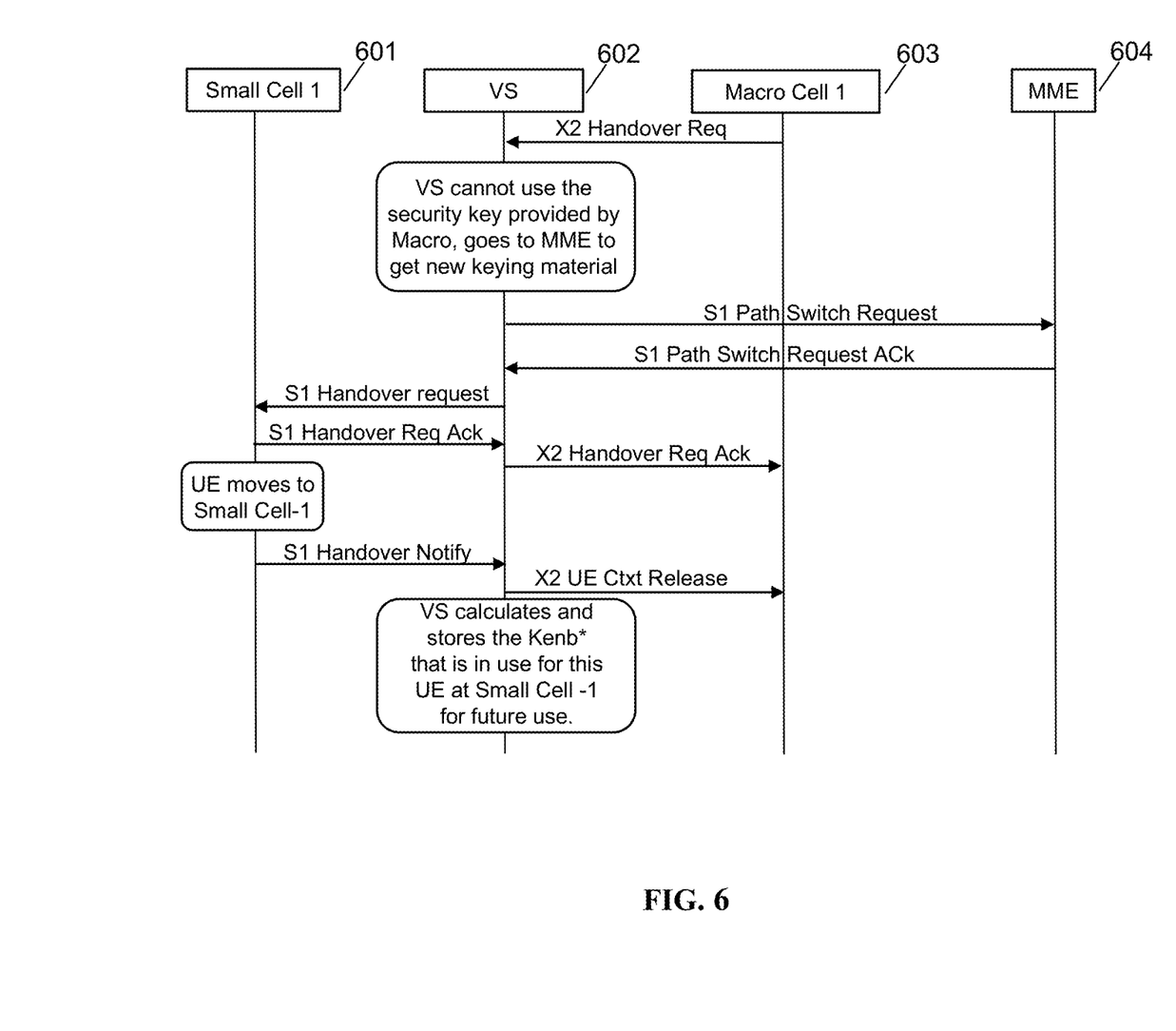
FIG. 6 is a call flow diagram showing an X2-S1 handover, in accordance with some embodiments.

FIG. 6 is a call flow diagram showing an X2-S1 handover, in accordance with some embodiments, showing a handover from macro cell to LTE small cell using X2 link at the VS. A small cell 601 is shown, together with VS 602, macro 603, and MME 604. Other network nodes are not shown for clarity.

Just as the VS used X2 link for handover originating from LTE small cell, the X2 link is also used when handover is initiated by macro cell.

Key problem with this handover:

The VS has to originate S1-Handover-Request towards Small Cell-1 when it receives X2 Handover-Request from Macro-Cell-1.

In S1 Handover Request, the VS has to include security information for UE to be used on access stratum. Security information consists of 'Next Hop Chaining Count (NCC)', and 'Next Hop key (NH)'.

Upon receiving this message, Small Cell-1 would derive 'Kenb*'. Here it would use its own PCI and DL EARFCN parameters to arrive at the result.

However, X2 Handover Request coming in from Macro Cell-1 already contains 'Kenb*' value. So, how can the VS convey this to the Small Cell-1?

Solution:

VS would not use the 'Kenb*' value that the Macro-Cell-1 has given.

VS would go to MME with S1 Path Switch Request, as further described in 3GPP TS 33.401.

MME in response provides the 'Next Hop Chaining Count (NCC)' and 'Next Hop key (NH)' value, as described therein at § 7.2.8.4.2.

VS would use these values in the S1 Handover Request that it forms towards the Small Cell-1.

After the handover succeeds, VS will itself calculate the Kenb* value that is in use for this UE at Small Cell-1 and store it in its data. This value can be used for future handovers.

Stated differently, security keys are routinely advanced within the same eNB without handover. Thus we perform this process to obtain the precursors for a new key at a gateway in the data path, and the new key is used for the handover.

It is worth noting the following:

Downlink Path switch towards MME happens before the handover actually completes. This means that downlink data will start coming at VS before the UE has moved to the small cell. VS may either buffer the data or drop the data packets, in some embodiments.

We have told EPC that UE is with VS before it has actually moved over. So if the handover later fails, then UE will not be able to continue in 'RRC-CONNECTED' state at either the source cell or the target cell. It will have to move to 'RRC-IDLE' state and come back again in any of these cells. Thus in some cases the UE may not be able to keep its link continuity with original source. It may have to go to Idle and come back again. Also, we may have to handle some other scenarios e.g. MME initiated some other request but the UE is still in the process of handover, so we have to handle it properly.

An advantage of this approach is that no X2 is required at the target ENB connected to us. The VS will do X2 only with its peer macro just as we do now.

Additional embodiments are described as shown in the following steps.

1. X2 Handover Request is received by VS from a macro ENB. Macro ENB has computed the target key by itself.
2. VS usually goes for S1 HO towards the target (connected over S1). But here VS can directly go to MME with Path-Switch-Request. As if the UE has moved.
3. EPC answers back by performing Path-Switch-Acknowledge. In this message, the MME gives fresh key (NH, NCC) value for VS to use. VS discards whatever was pre-computed key given by macro over X2.
4. Note that since we did the path switch already, the downlink data will also start coming in to VS. VS has to either buffer it or drop it.
5. Now, using this new key (NH, NCC) that VS received from MME, it will go for S1 Handover Request towards the target ENB.
6. Target ENB will compute the key and also copy back the NCC value in the target-to-source container that we will relay towards the macro ENB over X2.
7. The Macro-ENB will issue command to the UE to move (with the NCC value taken from the container).
8. UE will move to the target, the keys should match at UE and at target ENB.

In some embodiments, to minimize LI, LCS, PWS, charging etc. backends having an incorrect ECGI, TA, SA etc. for some duration. But this can be minimized by having VS 'release' the UE soon.

One aspect to consider is to implement intermediate buffers outside of PDCP layer where GTP-u packets are held until X2 data forwarding completes from the original Macro->VS handover before sending them to eNB. This reduces loss of data to the extent that it was pending in the macro's buffers.

Between steps 2 and 5 above, source macro is in Handover-Preparation-Wait state. It will be in this state until it receives X2-Handover-Request-Ack which will be sent by the VS (upon receiving S1 Handover Ack).

As the VS has already become the anchor for this UE towards the EPC, whether handover succeeds or fails, the VS has to send X2-UE-Context-Release to the source macro. This it should do after a wait for S1-Handover-Notify from target or a timer expiry.

We have already used the key available from Path-Switch-Ack. So there is no need for UE-Context-Modification later on.

In case the handover fails later on, UE will not be able to keep its link continuity with original source. It will have to go to Idle and come back again. However, whenever a handover fails, it will always come back from Idle. This is not a disadvantage, and in that situation, based on cell reselection it will select the cell after handover failure.

Figure 7:
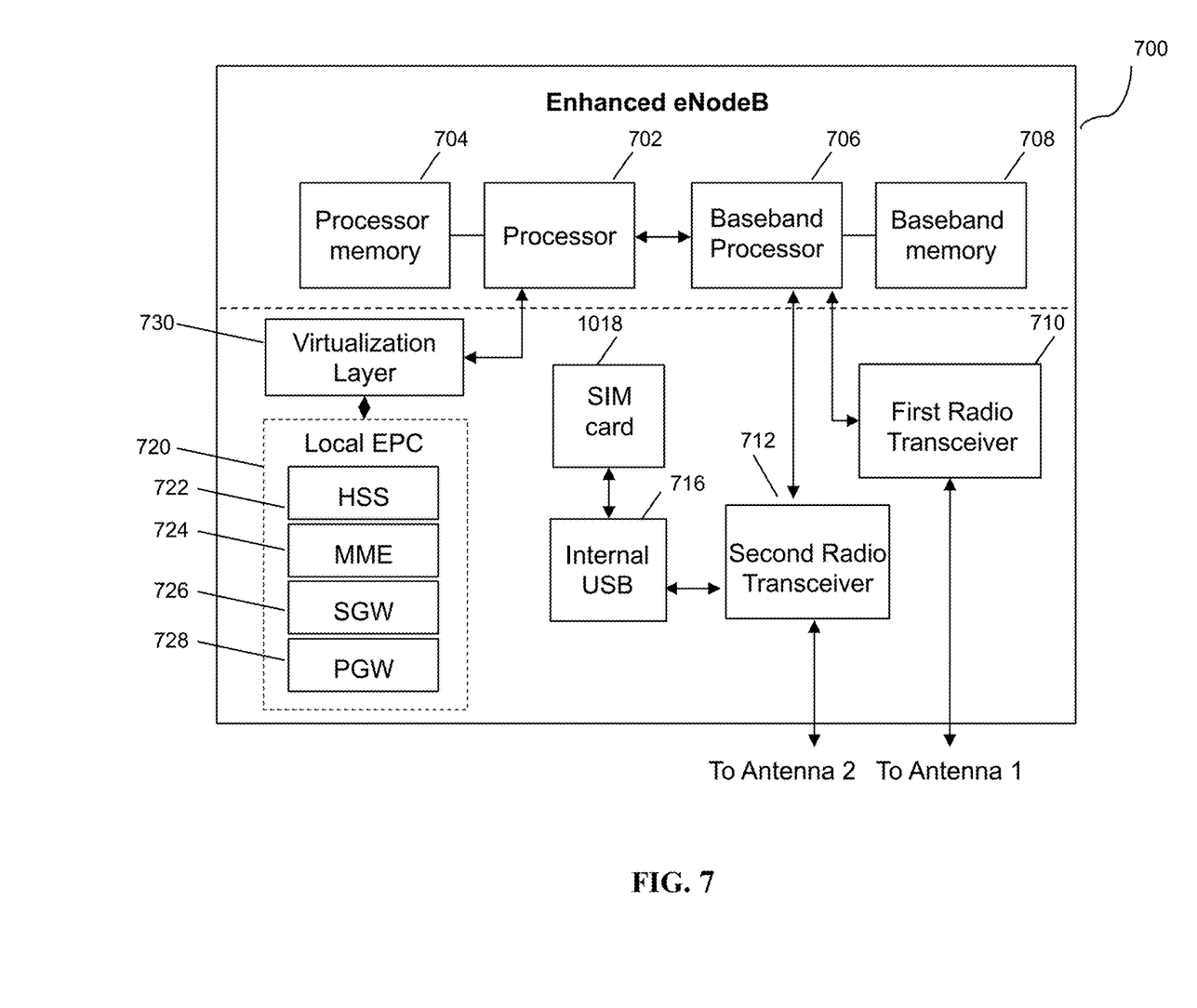
FIG. 7 is a schematic diagram of an enhanced eNodeB, in accordance with some embodiments.

FIG. 7 is a schematic diagram of an enhanced base station, in accordance with some embodiments. Mesh network base station 700 may include processor 702, processor memory 704 in communication with the processor, baseband processor 706, and baseband processor memory 708 in communication with the baseband processor. Base station 700 may also include first radio transceiver 710 and second radio transceiver 712, internal universal serial bus (USB) port 716, and subscriber information module card (SIM card) 718 coupled to USB port 714. In some embodiments, the second radio transceiver 712 itself may be coupled to USB port 716, and communications from the baseband processor may be passed through USB port 716.

A virtualization layer 730 may also be included for mediating communications with an evolved packet core EPC, specifically including the core network EPC (not shown) and local evolved packet core (EPC) module 720. Local EPC 720 may be used for authenticating users and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Virtualization layer 730 and local EPC 720 may each run on processor 702 or on another processor, or may be located within another device.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC). When no access to an operator EPC is available, local EPC 720 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Figure 8:
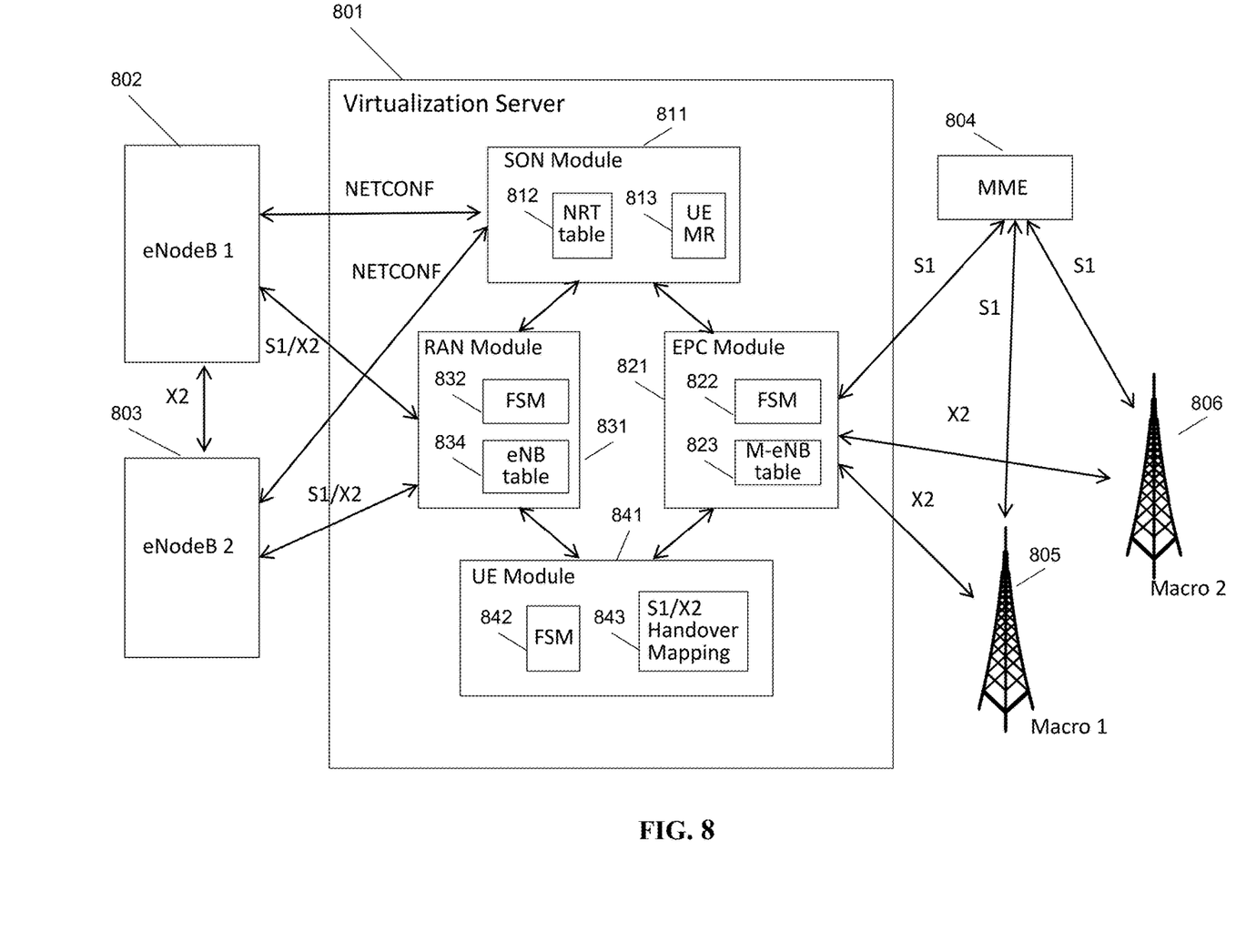
FIG. 8 is a schematic diagram of a virtualization server (VS), in accordance with some embodiments.

FIG. 8 is a schematic diagram of a virtualization server in a Long Term Evolution (LTE) architecture, in accordance with some embodiments. Virtualization server 801 provides services to, and is coupled to, eNodeB 1 802 and eNodeB 8 803, on a RAN side of a network (i.e., inside of the gateway). Virtualization server 801 provides services to, and is coupled to, MME 804, macro eNodeB 805, and macro eNodeB 806, on a core network side of the network (outside of the gateway). Virtualization server 801 corresponds to LAC 110, in some embodiments.

Within virtualization server 801 are self-organizing network (SON) module 811, containing neighbor relation table (NRT) 812 and UE measurement report processing module 813; evolved packet core (EPC) module 821, containing EPC finite state machine module 822 and macro eNodeB table 823; radio access network (RAN) module 831, containing eNodeB finite state machine module 832 and eNodeB table 834; and user equipment (UE) module 841, containing UE finite state machine module 842 and S1/X2 handover mapping table 843. Each of modules 811, 821, 831, and 841 are coupled to each other within virtualization server 801, and may execute on one or more shared processors (not shown) coupled with memory (not shown).

In some embodiments, SON module 811 may perform NRT maintenance, load information processing and fractional frequency reuse (FFR) processing; RAN module 831 may perform X2 association management with eNodeBs 802, 803; EPC module 821 may perform X2 association management with macro eNodeBs 805, 806; and UE module may perform X2 handover and S1/X2 translation between eNodeBs 802, 803 and macro eNodeBs 805, 806. All the above managers/modules interact with each other to accomplish the assigned functionality.

In some embodiments, EPC module 821 may contain EPC finite state machine module 822 and macro eNodeB table 823. EPC finite state machine module 822 may track the state of any messages or call flows being sent or received with a macro eNodeB, such as macro eNodeBs 805, 806. EPC FSM module 822 may, for example, determine whether a handover has been initiated by macro eNodeB 805, 806, as well as other functions. EPC FSM module 822 may also track which eNodeBs within the network are involved in communicating with the macro eNodeBs, and may perform network address translation by mapping incoming requests and messages from an eNodeB address external to the gateway 801 to an address internal to the gateway 801, using eNodeB table 823. In some embodiments the tracking and network address translation functions may be performed at the RAN module or in another module. Macro eNodeB table 823 may track all macro eNodeBs and any connections, bearers, tunnels, or calls open between an eNodeB internal to the gateway, such as eNodeBs 802 and 803.

In some embodiments, RAN module 831 may contain RAN finite state machine module 832 and eNodeB table 834. RAN module 831 is the counterpart to EPC module 821 on the side of the network inside the gateway. RAN FSM module 832 may track and receive messages and requests, and may track the state of the RAN node in any message exchange. eNodeB table 834 may include a mapping to from an eNodeB ID or cell ID to the ECGI ID used outside of the private network. In some embodiments, RAN module 831 may use eNodeB table 834 to perform network address translation, if applicable, on messages received by RAN module from eNodeBs 802, 803, so that the messages can be sent upstream to the EPC and/or core network. In some embodiments, network address translation is used at both RAN module 831 and EPC module 821, for connections initiated at the RAN and at the EPC, respectively.

In some embodiments, RAN module 831 may determine that an X2 connection may be terminated locally, without being sent outside the gateway, or even without being sent to the gateway at all. In those cases, RAN module 831 can instruct eNodeBs 802, 803 to perform direct X2 communication.

As RAN module 831 is in the data path for all S1 communications to the core network, including communications to MME 804, RAN module 831 may perform proxying and network address translation for the S1 connection, in addition to supporting the X2 connection, in some embodiments. RAN module 831 may also pass along any UE measurement reports received from UEs to either or both of UE module 841 and SON module 811.

In some embodiments, UE module 841 may contain UE finite state machine module 842 and S1/X2 handover mapping table 843. UE finite state machine module 842 may track states for call flows that are in process between a UE connected to one or more eNodeBs and either a core network node or a target eNodeB. For example, UE FSFM 842 may track when an X2 handover request message has not been responded to and should expire. UE FSFM 842 may also track X2/S1 handovers, in conjunction with S1/X2 handover mapping table 843. When an X2 handover request is received, UE FSFM 842 may, in some embodiments, determine whether a handover should be translated from S1 to X2, or vice versa, before the handover should continue. UE module 841 handles UE-related requests from both the RAN module 831 (from nodes internal to gateway 801) and from EPC module 821 (from nodes external to gateway 801).

In the present disclosure, the words "eNodeB" or "eNodeB" are used to refer to an LTE cellular base station. However, one of skill in the art would appreciate that it would be possible to provide the same functionality and services to other types of base stations, specifically to home eNodeBs (HeNodeBs), as well as any equivalents.

In the present disclosure, the words "federated," "virtualized," "proxy" or "proxied" may be viewed as aspects of the same concept. For example, it should be understood that the federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, all of the described functions may be performed at an eNodeB, or at a multi-radio access technology node (multi-RAT) node, instead of at a virtualization server, which would provide many of the described benefits herein. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
 at a coordinating gateway during a handover of a mobile device from a first base station to a second base station,
 receiving a first handover request from the first base station, wherein the first handover request is an X2 handover request;
 discarding a first shared security key received in the first handover request;
 sending a tunnel switching request to a core network node;
 obtaining precursors for a second shared security key from the core network node in a response to the switching request;
 sending a second handover request to the second base station with the precursors to calculate the second shared security key for securing a data connection for the mobile device following the handover, wherein the second handover request is an S1 request remapped from the X2 handover request using at least one of decoding, encoding, interworking, translating and proxying S1 to and from X2;
 deriving the second shared security key from the obtained precursors at the first base station;
 deriving the second shared security key from the obtained precursors at the coordinating gateway; and
 proxying the core network node to the second base station by providing Mobility Management Entity (MME) functionality including authentication and authorization and proxying the second base station to the core network node for all communications between the core network node and the second base station.

2. The method of claim 1, wherein the core network node is a mobility management entity (MME) in a Long Term Evolution (LTE) network.

3. The method of claim 1, wherein the tunnel switching request is an S1 path switch message, and wherein the precursors are next hop (NH) and next hop chaining count (NCC) values.

4. The method of claim 1, wherein the first shared security key and the second shared security key are KeNB* keys.

5. The method of claim 1, further comprising caching data between sending the tunnel switching request and completing the second handover request.

6. The method of claim 1, further comprising deriving the second shared security key from the obtained precursors using a carrier frequency of the second base station and a cell identifier of the second base station.

7. A method, comprising:
at a coordinating gateway during a handover of a mobile device from a first base station to a second base station, the coordinating gateway providing proxy services to the first base station, obtaining a first security key for the mobile device from a core network node;
receiving a first handover request from the first base station, wherein the first handover request is an X2 handover request;
sending a tunnel switching request to a core network node;
calculating a second security key based on the first security key, a carrier frequency of the second base station, and a cell identifier of the second base station;
sending a second handover request to the second base station with the second security key for securing a data connection for the mobile device following the handover, wherein the second handover request is an S1 request remapped from the X2 handover request using at least one of decoding, encoding, interworking, translating and proxying S1 to and from X2;
proxying the core network node to the second base station by providing Mobility Management Entity (MME) functionality including authentication and authorization, and proxying the second base station to the core network node for all communications.

8. The method of claim 7, wherein the core network node is a mobility management entity (MME) in a Long Term Evolution (LTE) network.

9. The method of claim 7, further comprising obtaining the first security key during an attach procedure for the mobile device to the core network node.

10. The method of claim 7, wherein the carrier frequency is an Evolved Absolute Radio Frequency Channel Number (EARFCN) and the cell identifier is a physical cell identifier (PCI).

11. The method of claim 7, further comprising obtaining the carrier frequency and the cell identifier of the second base station during a prior handover involving the second base station and the coordinating gateway.

12. The method of claim 7, wherein the first shared security key is a KeNB key and the second shared security key is a KeNB* key.

13. The method of claim 7, further comprising caching data between receiving the first handover request and completing the second handover request.

* * * * *